United States Patent [19]

Helmin et al.

[11] Patent Number: 5,269,821
[45] Date of Patent: Dec. 14, 1993

[54] COATABLE MIXTURES INCLUDING ERODABLE FILLER AGGLOMERATES, METHODS OF PREPARING SAME, ABRASIVE ARTICLES INCORPORATING CURED VERSIONS OF SAME, AND METHODS OF MAKING SAID ARTICLES

[75] Inventors: Harvey J. Helmin, Golden Valley; Walter L. Harmer, Arden Hills, both of Minn.

[73] Assignee: Minnesota Mining and Manufacturing Company, St. Paul, Minn.

[21] Appl. No.: 839,132

[22] Filed: Feb. 20, 1992

[51] Int. Cl.$^5$ .............................................. B24D 11/00
[52] U.S. Cl. ......................................... 51/295; 51/293; 51/298; 51/309
[58] Field of Search ................... 51/293, 295, 298, 309

[56] References Cited

U.S. PATENT DOCUMENTS

| | | | |
|---|---|---|---|
| 2,016,892 | 10/1935 | Clarvoe | 51/280 |
| 2,308,982 | 1/1943 | Kistler | 51/295 |
| 3,781,172 | 12/1973 | Pett et al. | 51/309 |
| 3,891,408 | 6/1975 | Rowse et al. | 51/295 |
| 3,893,826 | 7/1975 | Quinan et al. | 51/295 |
| 3,997,302 | 12/1976 | Supkis | 51/295 |
| 4,253,850 | 3/1981 | Rue et al. | 51/298 |
| 4,311,489 | 1/1982 | Kressner | 51/298 |
| 4,314,827 | 2/1982 | Leitheiser et al. | 51/298 |
| 4,381,188 | 4/1983 | Waizer et al. | 51/298 |
| 4,475,926 | 10/1984 | Hickory | 51/298 |
| 4,505,720 | 3/1985 | Gabor et al. | 51/295 |
| 4,518,397 | 5/1985 | Leitheiser et al. | 51/293 |
| 4,574,003 | 3/1986 | Gerk | 51/309 |
| 4,609,381 | 9/1986 | Narayanan et al. | 51/298 |
| 4,623,364 | 11/1986 | Cottringer et al. | 51/309 |
| 4,652,275 | 3/1987 | Bloecher et al. | 51/298 |
| 4,715,138 | 12/1987 | Cherico | 40/591 |
| 4,744,802 | 5/1988 | Schwabel | 51/309 |
| 4,761,163 | 8/1988 | Messere | 51/293 |
| 4,770,671 | 9/1988 | Monroe et al. | 51/293 |
| 4,799,939 | 1/1989 | Bloecher et al. | 51/293 |
| 4,903,440 | 2/1990 | Larson et al. | 51/298 |
| 4,907,376 | 3/1990 | Bouchard et al. | 51/209 R |
| 4,913,708 | 4/1990 | Kalinowski | 51/295 |
| 4,927,431 | 5/1990 | Buchanan et al. | 51/298 |
| 5,011,512 | 4/1991 | Wald et al. | 51/295 |
| 5,061,295 | 10/1991 | Hickory et al. | 51/298 |
| 5,078,753 | 1/1992 | Broberg et al. | 51/298 |

FOREIGN PATENT DOCUMENTS 0061035  9/1982  European Pat. Off. .

OTHER PUBLICATIONS

Kirk-Othmer, *Encyclopedia of Chemical Technology*, 3rd Ed., John Wiley & Sons, N.Y., vol. 17, pp. 384-399.
Grant & Hackl's *Chemical Dictionary*, 5th Ed., McGraw-Hill (1987) p. 541.

Primary Examiner—Mark L. Bell
Assistant Examiner—Willie J. Thompson
Attorney, Agent, or Firm—Gary L. Griswold; Walter N. Kirn; Jeffrey L. Wendt

[57] ABSTRACT

Coatable mixtures including erodable filler agglomerates, and abrasive articles into which they may be incorporated are presented, the agglomerates comprising a plurality of individual grains of water insoluble filler agglomerated by an agglomerating agent which includes water soluble filler and a binder. A preferred water soluble filler is $Al_2(SO_4)_3 \cdot 14\text{-}18H_2O$, a preferred water insoluble filler is $Na_3AlF_6$ (cryolite), while a preferred binder is a phenolic resin. Methods of making coatable mixtures including erodable filler agglomerates are also presented.

48 Claims, 2 Drawing Sheets

COATABLE MIXTURES INCLUDING ERODABLE FILLER AGGLOMERATES, METHODS OF PREPARING SAME, ABRASIVE ARTICLES INCORPORATING CURED VERSIONS OF SAME, AND METHODS OF MAKING SAID ARTICLES

CROSS-REFERENCE TO RELATED APPLICATIONS

This application is related to assignee's copending application Ser. No. 07/594,104 entitled "Coated Abrasive Containing Erodable Agglomerates".

FIELD OF THE INVENTION

This invention pertains to coatable mixtures including erodable filler agglomerates, and abrasive articles incorporating cured versions of same. The erodable filler agglomerates, in one preferred form, comprise cryolite particles and aluminum sulfate. The abrasive articles can be coated abrasives, nonwoven abrasives or bonded abrasives.

BACKGROUND OF THE INVENTION

Abrasive articles generally comprise abrasive grains secured within a binder. In the case of a bonded abrasive, the binder serves to bond the abrasive grains together such that they form a shaped mass. Typically, this shaped mass is in the form of a wheel and thus it is commonly referred to as a grinding wheel. In the case of coated abrasives, the binder serves to bond the abrasive grains to a substrate or backing, and the binder may be comprised of make and size coatings. In the case of nonwoven abrasives, the binder serves to bond the abrasive grains to a lofty, open, fibrous substrate.

In many abrasive articles the binder includes a particulate filler. Typically, the binder will comprise between 40 to 70 percent by weight particulate filler. The addition of the filler either increases the toughness and hardness of the binder and/or reduces the cost of the finished article, e.g., by decreasing the amount of binder required. The filler is typically an inorganic particulate material, generally having a particle size less than about 40 micrometers. Examples of common fillers in the abrasive industry include calcium carbonate, calcium oxide, calcium metasilicate, alumina trihydrate, silica, kaolin, quartz, and glass.

There exists a subclass of fillers, referred to as grinding aids, cutting aids, or generically as "active fillers". An active filler is typically a particulate material the addition of which to the binder has a significant affect on the chemical and physical processes of abrading which leads to improved performance. It is believed that active fillers will either 1) decrease the friction between the abrasive grains and the workpiece being abraded, 2) prevent the abrasive grains from "capping", i.e. prevent metal particles from becoming welded to the tops of the abrasive grains, 3) decrease the interface temperature between the abrasive grains and the workpiece, or 4) decrease the required grinding force.

Cryolite ($Na_3AlF_6$) is considered by those knowledgeable in the abrasives industry to be an active filler. Cryolite is a particulate material, typically having an average particle size less than about 50 micrometers, usually less than about 20 micrometers.

In general, active fillers are most efficient when used in a dry grinding mode.

The mechanism of wet grinding is much different than dry grinding. Active fillers such as cryolite generally do not function as effectively in the wet grinding mode. For equivalent amounts of stock removal, grinding may be done at increasingly higher forces, eventually leading to dulling of the abrasive article through degradation of the binder and/or abrasive grain pullouts. Abrasive product dulling may also occur as a result of the abrasive grains being worn to the make coating level.

Thus, an unmet need exists in the abrasives art, particularly in the art of wet grinding, for an active filler that provides for a controlled erosion of the abrasive layer during grinding, which results in a continuous exposure of the working abrasive grains, a slower increase in the required grinding force, and prolonged life of the abrasive article.

The following discussion evidences the abrasives industry's interest in fillers and grinding aids.

Assignee's copending application Ser. No. 594,104 describes erodable agglomerates in two forms:

"In one form, the erodable agglomerate can consist essentially of a binder and a grinding aid. In another form, the erodable agglomerate can consist essentially of a grinding aid. . . . In this particular form of the erodable agglomerate, the binder is absent and the grinding aid has a particulate size sufficiently large to form an erodable agglomerate. . . . The binder of the erodable agglomerate can be inorganic or organic . . . typically comprises a resinous or glutinous adhesive . . . ."

Assignee's U.S. Pat. No. 5,078,753 describes similar erodable agglomerates. In each of these references, the erodable agglomerates are preferably made by forming a homogeneous mixture of the grinding aid in the resinous or glutinous adhesive (or by dispersing the grinding aid in a medium), curing the adhesive (or drying the dispersion to form a cake), and mechanically crushing the cured mixture or cake to form the agglomerates using roll crushers or jaw crushers. In agglomerates including binder, the binder can be selected from phenolic resins, polyester resins, and the like.

While the above-mentioned erodable agglomerates have been found to be quite useful in the production of abrasive articles, they do not provide a controllable mechanism to degrade under wet grinding conditions, and their production involves the energy and labor intensive steps of crushing and screening to achieve the desired agglomerate size distribution. It would therefore be desirable to avoid these steps and provide an agglomerate that erodes both under mechanical forces and under wet grinding conditions.

U.S. Pat. No. 4,311,489 (Kressner) describes an agglomerate of fine abrasive grains, such as aluminum oxide abrasive grains, and an inorganic, brittle, matrix formed for example of cryolite. Two methods of forming the agglomerates are disclosed, each having their own disadvantages. In the first method, the abrasive grains and matrix are fused at high temperature (1050°–1100° C.) and then crushed to achieve the desired grain size, two obviously energy and equipment intensive steps. The second method employs a silicate binder containing an active filler such as cryolite. The abrasive grains, cryolite, and a silicate solution (such as potassium silicate, 38% solids) are combined to form a mortar-like mixture which is deposited onto a silicone release substrate, dried in a hot-air oven at about 120°

C., and crushed to the desired grain size. This method is also quite energy and equipment intensive.

U.S. Pat. No. 4,381,188 (Waizer et al.) describes a grinding disk including filler pellets or granules consisting of a bonding agent (such as synthetic resin), a matrix, and substances embedded therein, the matrix being made of fine grained fillers resistant to water and air, such as cryolite, and substances selected from active fillers susceptible to water or temperature, e.g., ferric chloride, tin (II) chloride, manganese chloride, embedded in the matrix. The pellets or granules are preferably made in a dry mode by means of rollers having recessed portions. The composition of the pellets is adapted to "guarantee sufficient protection of the hygroscopic or otherwise unstable substances ... the constituent of the highly hygroscopic substances . . . should not exceed 30–40 percent by volume preferably, they are present in any amount of 10–40 percent by volume" referenced to pellet volume.

Other references of interest describing the use of cryolite, inorganic sulfates, and the like, as fillers in abrasive articles include U.S. Pat. Nos. 2,016,892; 2,308,982; 4,253,850; 4,475,926; 4,609,381; 4,761,163; 4,903,440; and 4,907,376, and European Patent Application 0 061 035 A2 (published Sep. 29, 1982). However, none of the references teaches or suggests the production or use of erodable filler agglomerates.

The presence of active fillers in coatable or moldable mixtures tends to improve the abrading characteristics of abrasive articles incorporating cured versions of same. However, the abrasive industry is always evaluating means to improve the abrading efficiency (i.e., weight of workpiece removed per weight of abrasive article lost) of abrasive articles without unduly increasing their cost.

SUMMARY OF THE INVENTION

In accordance with the present invention, a coatable mixture including erodable filler agglomerates, and abrasive articles incorporating cured versions of same, are presented. The abrasive articles exhibit improved abrading efficiency when compared with abrasive articles containing only non-agglomerated fillers. During wet grinding operations, a water soluble portion of the erodable filler agglomerates of the invention gradually dissolves, providing a mechanism for the degradation of the erodable filler agglomerates. This leads to an increase in the abrasive layer porosity at the surface and provides a mechanism for erosion of the abrasive layer, thus exposing new abrasive particles.

The coatable mixture of the present invention comprises erodable filler agglomerates and a binder precursor, the erodable filler agglomerates comprising a plurality of individual particles of water insoluble filler agglomerated by an agglomerating agent. "Agglomerating agent", in the case of a coatable mixture in accordance with the invention, is a composition which consists essentially of water soluble filler and binder precursor. In the case of abrasive articles, "agglomerating agent" is a composition which consists essentially of water soluble filler and binder, "binder" meaning a cured resin. The erodable filler agglomerates may thus contain additives which do not adversely affect the erodability of the agglomerates.

As used herein the term "erodable" refers to the ability of an erodable filler agglomerate according to the invention to break down its structure in a controlled manner, for example, by fracture under mechanical grinding forces and/or by the dissolving of a water soluble component under wet grinding conditions.

"Water soluble" and "water insoluble" are, of course, relative terms, with solubility of a solute in water generally increasing with temperature. The terms are meant to describe the relative water solubility of the two filler components by their published solubility values in water at about 0°–50° C., as per Table A, below. Thus, "water soluble filler" means an inorganic material having a cold water solubility of at least about 10 grams per 100 cubic centimeters (gms/100 cc) water, more preferably at least 50 gms/100 cc of water. "Water insoluble filler" means an inorganic material having cold water solubility of at most about 1 gm/100 cc water.

"Water", when used herein in the context of "water solubility" and water as an ingredient in solutions and coatable mixtures, means "consisting essentially of water". "Wet" means grinding conditions where a water spray or flood is used.

"Agglomerating agents consisting essentially of water soluble filler and binder precursor", as used herein, means the water soluble filler is preferably no more than about 10 weight percent (more preferably no more than about 5 weight percent) of the total weight of water soluble and water insoluble fillers, but at least about 10 weight percent (more preferably at least about 50 weight percent) of the total weight of the agglomerating agent. The agglomerating agent may comprise binder precursor and other ingredients, such as non-agglomerated filler, which do not adversely affect the erodability of the erodable filler agglomerates of the present invention. It is theorized that the presence of the water insoluble filler in the coatable mixtures of the invention allows the erodable filler agglomerates to form with much less binder precursor in the agglomerates than the agglomerates of assignee's copending applications, mentioned previously.

The water insoluble filler of the erodable filler agglomerates of the present invention preferably comprise materials selected from the group consisting essentially of inorganic halide salts represented by general formula I $$(A)_y(IIIa)(X)_z \qquad (I)$$

having a solubility in cold water of at most about 10 gms/100 cc and mixtures thereof wherein:

A = alkali metal ion, ammonium ion or combinations thereof;
IIIa = $Al^{3+}$, $Ga^{3+}$, or combination thereof;
X = halide ion or combination thereof;
y = an integer from 1 to 10; and
z = y + 3.

Particularly preferred water insoluble fillers within formula I include those inorganic halide salts wherein A is an alkali metal ion, most preferably $Na^+$ ion. It is to be considered within the scope of this invention to include compounds such as $Li_3Na_3(AlF_6)_2$ as water insoluble fillers.

The erodable filler agglomerates of the invention preferably comprise water soluble fillers selected from the group consisting essentially of inorganic compounds represented by general formula II $$B_n^{m+}C_m^{n-}\cdot hH_2O \qquad (II)$$

having water solubility in cold water of at least 10 gms/100 cc and mixtures thereof wherein:

B=Al, NH$_4$, Ni, Zn, Fe, Cu, Mg, alkali metal, or combinations thereof;

C=HSO$_4$, SO$_4$, NO$_3$, PO$_4$, HPO$_4$, BF$_4$, H$_2$PO$_4$ or combinations thereof;

n=an integer from 1 to 5;

m=5−n; and h=an integer ranging from about 0 to about 20.

Examples of preferred water soluble fillers within formula II include those wherein C is SO$_4$, with the most preferred water soluble filler being Al$_2$(SO$_4$)$_3$·14–18H$_2$O.

Particularly preferred erodable filler agglomerates of the invention are those wherein the agglomerating agent consists essentially of the water soluble filler Al$_2$(SO$_4$)$_3$.14–18H$_2$O and the water insoluble filler consists essentially of Na$_3$AlF$_6$ (cryolite).

The erodable filler agglomerates of the invention are formed in situ (i.e., a "one step method") in the coatable mixture of the present invention. The erodable filler agglomerates formed in situ are ideally suited for use as active fillers in abrasive articles. Alternatively, the erodable filler agglomerates may be separated from a first coatable mixture and used in a second coatable mixture which may be the same or different from the first coatable mixture (i.e., a "two step method").

The binder must be compatible (or capable of being rendered compatible) with both the abrasive particles and the erodable filler agglomerates, as well as with the backing or mat of the abrasive article in the cases of coated and nonwoven abrasive articles. In addition, the binder must not be affected substantially by the presence of the water soluble filler in as much as the binder must retain its properties with cured, for example hardness, and the like.

Suitable binders for the abrasive articles of this invention comprise a cured organic resin, the organic resin selected from the group consisting of phenolic resins, aminoplast resins, urethane resins, epoxy resins, acrylic-based resins, acrylated isocyanurate resins, urea-aldehyde resins, isocyanurate resins, acrylated urethane resins, acrylated epoxy resins, and mixtures thereof.

In the case of a coated abrasive article, one preferred coated abrasive article has a size coating comprising the erodable filler agglomerates described above, and a make coating. A preferred make coating comprises an organic resin and titanium dioxide. The addition of titanium dioxide, particularly to phenolic resins, improves the cured binder properties, increasing both the wet and dry hardness. Titanium dioxide also increases the surface tension of the uncured make coating, which tends to orient the abrasive grains with a sharp point distal from the backing. Unexpectedly, the combination of the erodable filler agglomerates in the size coating, with titanium dioxide in the make coating, appears to have a synergistic effect to increase the abrading performance of coated abrasives.

Another preferred coated abrasive in accordance with the present invention comprises a plurality of erodable filler agglomerates, as above described, and a plurality of abrasive particles, both the erodable filler agglomerates and the abrasive particles dispersed throughout and adhered within a binder attached to a substrate or backing. The abrasive articles of this embodiment are made using slurry of the erodable filler agglomerates and abrasive particles in a binder precursor which is coatable or capable of being rendered coatable. The slurry is coated or spread onto a backing and the coated backing subsequently subjected to conditions which cure the binder precursor. In bonded abrasives, the mixture is placed in a mold and subjected to conditions which cure the binder precursor. Heat and/or radiation energy are suitable conditions under which the binder precursor herein may be cured.

A method of preparing a coatable mixture containing erodable filler agglomerates and binder precursor, as above described, is another aspect of the invention, the method including the steps of:

(a) mixing water soluble filler with a sufficient amount of water and at a temperature sufficient to dissolve at least a portion of the water soluble filler to form a solution comprising the water soluble filler;

(b) separately combining water insoluble filler, binder precursor, and water in proportions and at a temperature sufficient to form a dispersion comprising the water insoluble filler;

(c) combining the solution of step (a) with the dispersion of step (b) to form a coatable mixture from which erodable filler agglomerates will form in situ in the coatable mixture; and (d) allowing the formation of erodable filler agglomerates comprising a plurality of individual particles of water insoluble filler agglomerated in the coatable mixture in situ by an agglomerating agent, the agglomerating agent being as above described.

The immediately-above described method is a preferred "one-step" method of producing the coatable mixture of the invention. Optionally, a "two step" procedure may be employed wherein after step (d), the coatable mixture is diluted with organic solvent to render the mixture filterable (step e), the diluted mixture passed through a filtering means, such as filter paper, wire screen, and the like, to separate the erodable filler agglomerates from the liquid portion (step f), and the erodable filler agglomerates added to a second coatable mixture being the same as or different from the coatable mixture of either of steps (c) or (d), or both. Thus, the erodable filler agglomerates themselves are an aspect of the invention, having composition as above described.

Methods of making coated abrasive articles are also presented, one of the methods including the steps of coating one side of a backing with a make coating, applying to the make coating a plurality of abrasive particles, subjecting the make coating to conditions which partially cure the make coating, coating the resulting structure with one of the coatable mixtures prepared by the processes described immediately above to form a size coating, and subjecting the make and size coatings to conditions which cure the make and size coatings. Another method comprises combining abrasive particles with the coatable mixture produced in step (c) above to form a coatable abrasive slurry, coating one side of a backing with the coatable abrasive slurry, and subjecting the coated backing to conditions which cure the binder precursor.

Other aspects and advantages of the invention will become apparent from the detailed description which follow.

DESCRIPTION OF PREFERRED EMBODIMENTS

Figure 1:
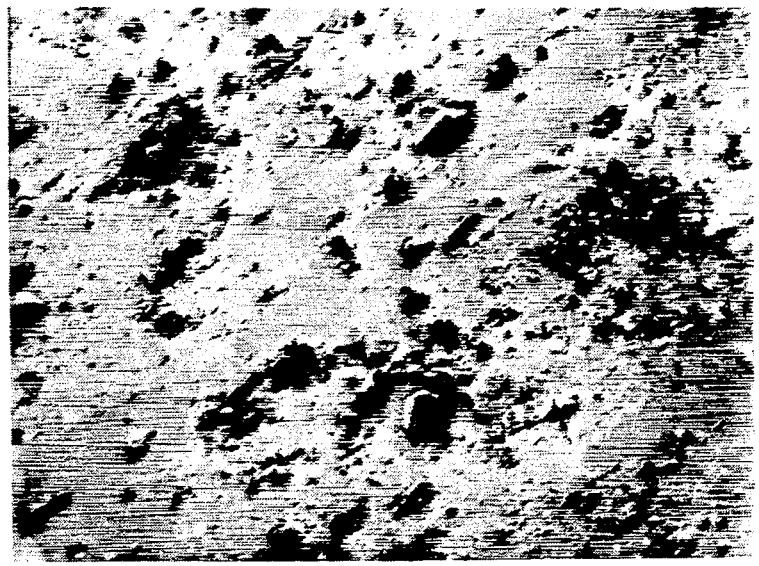
FIG. 1 shows a scanning electron micrograph (SEM, 200× magnification) of prior art cryolite particles.

Coatable Mixtures Including Erodable Filler Agglomerates and Methods of Making Same It has been observed that during the preparation of certain coatable mixtures, the presence of certain water soluble fillers causes certain water insoluble filler particles to agglomerate in situ. Although not wishing to be bound by any theory, it may be possible that in the presence of the water insoluble filler the water soluble filler experiences a common ion effect, wherein the presence of an insoluble or slightly water soluble salt decreases the solubility of a normally very soluble or infinitely water soluble filler having an ion in common with the insoluble or slightly soluble salt. Surprisingly, it has been observed that when the coatable mixtures of the invention were prepared with calcium carbonate or potassium tetrafluoroborate as water insoluble fillers, the presence of aluminum sulfate did not cause either the calcium carbonate or potassium tetrafluoroborate particles to agglomerate.

A preferred coatable mixture of the invention will comprise (on a dry weight basis) between about 30 to 60 weight percent binder; preferably between 30 to 60 weight percent cryolite, and less than about 10 weight percent, more preferably about 5 weight percent, even more preferably about 2 weight percent aluminum sulfate [$Al_2(SO_4)_3 \cdot 14-18H_2O$]. At levels even as low as about 0.5 weight percent or lower, the presence of $Al_2(SO_4)_3 \cdot 14-18H_2O$ water soluble filler has had a positive effect on the abrading performance of coated abrasives made using coatable mixtures of the invention. The water soluble filler $Al_2(SO_4)_3 \cdot 14-18H_2O$ is commonly referred to in the inorganic chemical art as "aluminum sulfate 16", the "16" referring to the average degree of hydration of $Al_2(SO_4)_3 \cdot 14-18H_2O$. Water soluble fillers useful in the invention, such as $Al_2(SO_4)_3 \cdot 14-18H_2O$, and water insoluble fillers, such as cryolite, are available from various inorganic chemical suppliers.

Particularly preferred inorganic halide salts suitable for use in the coatable mixtures of the present invention include cryolite ($Na_3AlF_6$) and "cryolite derivatives" such as $Li_3Na_3(AlF_6)_2$, $(NH_4)_2GaF_6$ and the like. The invention also contemplates using mixtures of these as the water insoluble filler. Particularly preferred is the inorganic halide salt cryolite.

In addition to the above mentioned components, the coatable mixture comprises water sufficient to dissolve the water soluble filler and optional organic solvent to lower the coatable mixture viscosity so that it is easier to process. Typically, and preferably, during curing of the binder precursor, water and optional organic solvent are removed. (Alternatively, a reactive diluent may be employed which reacts with the binder precursor and remains in the cured binder.) Since aluminum sulfate and other water soluble fillers may be insoluble in alcohol solvents such as ethylene glycol monobutyl ether, ethylene glycol monomethyl ether, ethylene glycol monoethyl ether, and the like, the use of these or other solvents which tend to increase the viscosity of the coatable mixture of the invention should be held to a minimum. It is preferred that the coatable mixture contain at least about 0.5 weight percent of one of the above-mentioned solvents per total weight of coatable mixture for viscosity reduction; however, if more than about 50 weight percent of one of these solvents, based on total coatable mixture weight, is used the water soluble filler may precipitate out of the coatable mixture, which may inhibit formation of the erodable filler agglomerates.

In the preparation of coatable mixtures containing erodable filler agglomerates, it is preferred that the water soluble filler be at least partially dissolved in water in a first container to form a solution. More preferably, the water soluble filler is completely dissolved in water to form an unsaturated or saturated solution of the water soluble filler. Supersaturated solutions of the water soluble filler are not preferred as they appear to achieve no additional benefit, although they are not without the scope of the invention. In a second container, binder precursor, water, water insoluble filler particles, and any optional additives and optional organic solvent are mixed together to form a dispersion of water insoluble filler particles. Subsequently, the solution of water soluble filler is combined with the dispersion of the second container. The water soluble filler may alternatively be added directly to the binder precursor. However, it has been found easier to consistently prepare a uniform coatable mixture if the water soluble filler is first at least partially dissolved in water. Either one or both of the solution and dispersion may be heated slightly to speed dissolving of the water soluble filler or dispersion of the water insoluble filler, or to render the resulting coatable mixture slightly less viscous, but this has not been found to be necessary or even desired.

One specifically preferred coatable mixture of the invention comprises an 82 percent by weight solids solution used to form a size coating which comprises (weight basis)

| | |
|---|---|
| 76% (wt) solids phenolic resin | 51.80 parts |
| cryolite | 41.75 |
| 41.7% aqueous $Al_2(SO_4)_3 \cdot 14-18H_2O$ solution | 2.04 |
| water | 3.85 |
| ethylene glycol monoethyl ether | 0.56 |
| | (100.00). |

The phenolic resin, water and ethylene glycol monoethyl ether are blended and then heated to about 40° C. (It is not necessary to heat the solution to form the erodable filler agglomerates of the invention, but heating renders the solution easier to further process.) Cryolite is added to the solution and the solution agitated to form a dispersion of the cryolite in the liquid components. The aqueous $Al_2(SO_4)_3 \cdot 14-18H_2O$ is then added slowly to the cryolite dispersion and the erodable filler agglomerates form in situ and may be detected visually without the use of magnification.

The coatable mixture may then be applied as a size coating over abrasive particles and a make coating, or abrasive particles may be added to the coatable mixture to form a coatable abrasive slurry. The abrasive slurry is then coated or spread onto a backing in the course of manufacturing an abrasive article. In a preferred coating operation it has been found desirable to heat the coatable mixture to a temperature ranging from about 40° C. to about 50° C. in order to reduce the coatable mixture viscosity slightly.

As stated in the Summary of Invention, "water soluble" and "water insoluble" are meant to reflect the approximate water solubility of the filler components in "cold water" (about 0°-50° C.). Table A presents a compilation of published water solubilities of some fillers within formulas I and II, compiled from *The Handbook of Chemistry and Physics*, 58th Ed., CRC Press, Inc., West Palm Beach, Fla., pp. B-85 et. seq. The terms "slightly soluble", "soluble" and "very soluble" are defined according to the United States Pharmacopeia in Table B, which is Table 85 of Grant & Hackh's *Chemical Dictionary*, 5th Ed., McGraw-Hill (1987) page 541.

It can be seen from Table A that the water soluble filler and water insoluble filler must be chosen with the relative solubilities of the species in mind. For example, one would not expect as much success in agglomerating cryolite with $ZnSO_4$, as one would expect success agglomerating cryolite with $ZnSO_4.7H_2O$. However, to optimize grinding efficiency, depending on the grinding conditions, workpiece, etc., the solubility of the water soluble filler will be selected accordingly.

Preferably, the water insoluble fillers are selected from inorganic halide salts within formula I above; most preferably the water insoluble filler is cryolite.

Within formula II above, "B" of the water soluble filler is preferably selected from the group consisting of: alkali metal, aluminum, ammonium, nickel, zinc, iron, copper, magnesium, and combinations thereof. Particularly preferred as "B" are aluminum, nickel and zinc, with aluminum being most preferred. The most preferred "C" is $SO_4$; however, it is within the scope of this invention to utilize a combination of water soluble fillers in the erodable filler agglomerates. The value of h is also significant in that the preferred degree of hydration (i.e., "h") is dependent upon "B" and "C".

TABLE A

| Fillers | Filler solubilities Sol. in cold* $H_2O$, parts filler/100 parts $H_2O$ |
|---|---|
| Water Soluble Fillers | |
| $Al_2(SO_4)_3$ | $31.3^0$ |
| $Al_2(SO_4)_3.18H_2O$ | $86.9^0$ |
| $Al(NO_3)_3.9H_2O$ | $63.7^{25}$ |
| $CuSO_4.5H_2O$ | $31.6^0$ |
| $FeSO_4 5H_2O$ | soluble |
| $FeSO_4.7H_2O$ | 15.65 |
| $Li_2SO_4$ | $26.1^0$ |
| $Li_2SO_4.H_2O$ | $34.9^{25}$ |
| $MgSO_4$ | $26^0$ |
| $MgSO_4.7H_2O$ | $71^{20}$ |
| $(NH_4)_3PO_4.3H_2O$ | $26.1^{25}$ |
| $(NH_4)_2HPO_4$ | $57.5^{10}$ |
| $NH_4BF_4$ | $25^{16}$ |
| $(NH_4)_2SO_4$ | $70.6^0$ |
| $NH_4HSO_4$ | 100 |
| $NaBF_4$ | $108^{26}$ |
| $Ni(NO_3)_2.6H_2O$ | $238.5^0$ |
| $NiSO_4$ | $29.3^0$ |
| $NiSO_4.6H_2O$ | $62.52^0$ |
| $NiSO_4.7H_2O$ | $75.6^{15.5}$ |
| $Na_2SO_4$ | soluble |
| $Na_2SO_4.7H_2O$ | $19.5^0$ |
| $Na_2SO_4 10H_2O$ | $11^0$ |
| $Zn(NO_3)_4.5H_2O$ | very soluble |
| $ZnSO_4$ | soluble |
| $ZnSO_4.7H_2O$ | $96.5^{20}$ |
| $KH_2PO_4$ | $33^{25}$ |
| $Na_2HPO_4.2H_2O$ | $100^{50}$ |
| Water Insoluble Fillers | |
| $Na_3AlF_6$ (cryolite) | slightly soluble |
| $Li_3Na_3(AlF_6)_2$ | $0.074^{18}$ |

TABLE A-continued

| Fillers | Filler solubilities Sol. in cold* $H_2O$, parts filler/100 parts $H_2O$ |
|---|---|
| $(NH_4)_2GaF_6$ | insoluble |

*superscript indicates temperature, °C., where given

TABLE B

| USP Solubility Classification | |
|---|---|
| Description | Parts of solvent required for 1 part solute |
| Very soluble | less than 1 |
| Freely soluble | 1-10 |
| Soluble | 10-30 |
| Sparingly soluble | 30-100 |
| Slightly soluble | 100-1000 |
| Very slightly soluble | 1,000-10,000 |
| Practically insoluble or insoluble | 10,000+ |

A typical and preferred resole phenolic binder precursor solution has pH ranging from about 8 to about 10. The pH of the coatable mixtures of the invention may vary over a wide range, from about 3.0 to about 10, based on selection of binder precursor, water soluble filler type and amount, and other variables. It will be appreciated by those skilled in the coating art that the particularly preferred pH of the coatable mixtures within the invention will depend primarily on the binder precursor chosen, and secondarily on the water soluble filler, the ratio of ingredients, temperature and the like. Coatable mixture pH outside the range normally recommended for the particular binder precursor solution may have an adverse affect on binder precursor curing and or viscosity.

Erodable filler agglomerates of the invention comprise water insoluble filler and agglomerating agent consisting essentially of one or more of the water soluble fillers just described. When the erodable filler agglomerates are exposed to chemical or mechanical erosion conditions, such as a water spray or flood when wet grinding, the erodable filler agglomerates break apart, exposing "fresh" abrasive particles.

The water soluble filler is preferably no more than about 10 weight percent (more preferably no more than about 5 weight percent) of the total weight of water soluble and water insoluble fillers, but at least about 10 weight percent (more preferably at least about 50 weight percent) of the total weight of the agglomerating agent. It will be appreciated by those skilled in the art that some percentage of the agglomerating agent will comprise binder precursor, non-agglomerated additives, and the like. These may be tolerated as long as the erosive nature of the erodable filler agglomerates is not adversely affected.

Figure 2:
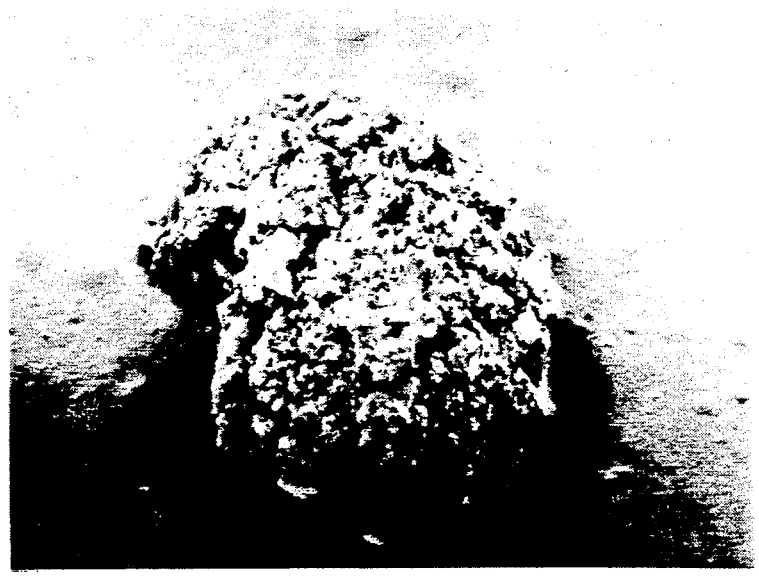
FIG. 2 shows an SEM (200× magnification) of one erodable filler agglomerate made in accordance with the method of the invention.

As mentioned previously, while not intending to be bound to any particular theory, it is believed that the presence of the water soluble filler in the coatable mixtures of the invention allows erodable filler agglomerates to form in situ. FIG. 1 shows a scanning electron micrograph (SEM, 200× magnification) of cryolite in its non-agglomerated form, whereas FIG. 2 shows an SEM (with identical magnification as FIG. 1) of an erodable filler agglomerate of the invention. The erodable filler agglomerate of FIG. 2 was formed using one preferred method of the invention, wherein 2.6 parts by weight (dry weight basis) of aluminum sulfate was substituted for a portion of the cryolite in the coatable mixture.

Figure 3:
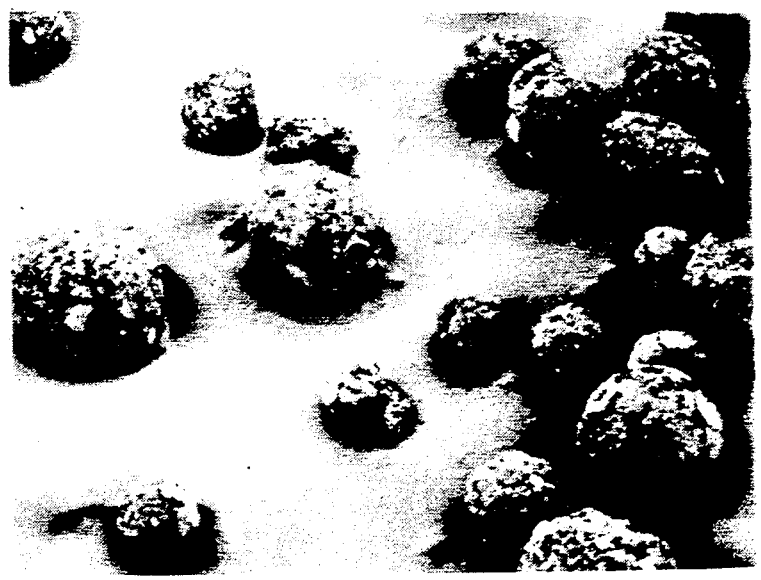
FIG. 3 shows an SEM (50× magnification) of a plurality of erodable filler agglomerates made in accordance with the method of the invention.

The erodable filler agglomerates of the present invention can vary widely in shape, size, surface contour, and the like, as evidenced by viewing the SEMs of FIGS. 2 and 3 (the former at 200× magnification, the latter at 50× magnification). The largest dimension can range from about 10 to about 1000 micrometers, the average diameter not appearing to be critical. Typical useful average diameters fall within the range of from about 10 to about 100 micrometers. The erodable filler agglomerates of the invention are not required to be any particular shape, with spheres, rods, pellets, and other conventional shapes being acceptable. Spherical erodable agglomerates may be preferred in situations where the erodable agglomerates of the invention are used in "thick" coatings, whereas pellet-shaped erodable filler agglomerates may be preferred for other coating geometries.

The erodable filler agglomerates of the invention may, of course, be screened to obtain a desired size or size distribution of erodable filler agglomerates. Thus, the range of sizes of the agglomerates of the invention can be controlled to a certain degree by the process conditions, ingredient ratios, etc. of the coatable mixture of the invention, and further by mechanical techniques after the erodable filler agglomerates have been separated from their "mother" coatable mixture.

Consideration of the abrasive particle size used in the abrasive articles of the invention is also important in selecting erodable filler agglomerate size and size distribution. The ratio of the average diameter of the abrasive particles to the average diameter of the erodable filler agglomerates of the invention may range from about 2.5:1 to about 0.5:1. As noted in assignee's U.S. Pat. No. 5,078,753, in the case of coated abrasives, if the erodable filler agglomerates are too small, relative to the abrasive particle size, insufficient support will be given t the abrasive particles and abrasion performance of the resulting coated abrasive may be adversely affected. If the erodable filler agglomerates of the invention are too large, relative to the abrasive particles, the erodable filler agglomerates of the invention may prevent the abrasive particles from contacting the workpiece.

The erodability characteristics of the erodable filler agglomerates of the invention, i.e. the rate of breakdown or erosion under a given set of chemical and/or mechanical forces, can be varied by varying the water soluble and insoluble filler identity, relative amounts, or both. For example, erodable filler agglomerates of the invention having a greater percentage of water soluble filler component will erode more quickly and present fresh water insoluble filler particles to the workpiece faster than agglomerates having a lower percentage of water soluble filler.

As mentioned in the Summary of the Invention, it is possible to separate the erodable filler agglomerates of the invention from the coatable mixture form which they were formed, typically and preferably by reducing the viscosity of the coatable mixture to render it filterable or screenable. Organic solvents, such as aliphatic alcohols, may be used for viscosity reduction, as well as ethers.

Once separated from their "mother" coatable mixture, the erodable filler agglomerates of the invention appear to be stable indefinitely. Preferably, the erodable filler agglomerates of the invention are kept in closed container, at room temperature (about 25° C.), to avoid extremes of humidity and temperature, obviously to ensure that the agglomerates do not absorb a substantial amount of water to the extent that the erodable agglomerates degrade to essentially non-agglomerated filler, or lose water of hydration. Of course, the container and erodable filler agglomerates are preferably not allowed to experience extremes of mechanical forces, which might cause the erodable filler agglomerates of the invention to mechanically degrade prematurely.

The separated erodable filler agglomerates may then be used in a "two-step" process wherein a second coatable mixture is formed, and the previously formed erodable filler agglomerates added thereto. Of course, preformed erodable filler agglomerates may be added to a coatable solution in which another set of erodable filler agglomerates is to be formed, which may be the same or different than the preformed erodable filler agglomerates.

The erodable filler agglomerates described herein may also be used as a portion of the agglomerates described in U.S. Pat. Nos. 4,799,939 and 4,652,275, incorporated by reference herein. Briefly, the agglomerates of these references are made by dispersing a matrix material (such as wood flour, vermiculite, and the like) in an aqueous medium, and the dispersion mixed with abrasive particles and a [liquified] binder [precursor] to form a mixture. The mixture is then cured to form an agglomerate comprising individual particles of abrasive, matrix material, and [liquified] binder [precursor]. The agglomerates of the present invention would preferably be added to the mixture prior to curing.

The coatable mixture may comprise materials other than binder precursor and erodable filler agglomerates. Materials commonly utilized in abrasive articles as additives include non-agglomerated fillers, coupling agents, wetting agents, dyes, pigments, plasticizers, release agents and combinations thereof. Non-agglomerated fillers, such as grinding aids, encompass a wide variety of different materials and can be inorganic or organic based. Examples of suitable grinding aids for use in the present invention include waxes, organic halide compounds, non-aluminum containing halide salts, and metals and their alloys. Examples of organic halide compounds include chlorinated waxes, tetrachloronaphthalene, pentachloronaphthalene, and polyvinyl chloride. Examples of non-aluminum based halide salts include sodium chloride, potassium tetrafluoroborate, sodium tetrafluoroborate, silicon fluorides, potassium chloride, and magnesium chloride. Examples of metals include tin, lead, bismuth, cobalt, antimony, cadmium, iron or titanium and mixtures thereof, all in their elemental forms. Other miscellaneous grinding aids include calcium carbonate, elemental sulfur, organic sulfur compounds, graphite and metallic sulfides. Examples of preferred non-agglomerated fillers include calcium carbonate, calcium oxide, calcium metasilicate, titanium dioxide, alumina trihydrate, silica, kaolin, quartz and glass. The use of titanium dioxide in the make coating at a weight percentage ranging from about 5 to about 20 (dry weight basis) is preferred.

The amount of non-agglomerated filler or grinding aid will be typical of that used in the particular type of abrasive article, with generally lower amounts of non-agglomerated fillers and grinding aids being employed when higher amounts of the erodable filler agglomerates formed in the coatable mixtures of the invention are employed.

Abrasive Articles

Abrasive articles of the invention can be coated abrasives, nonwoven abrasives or bonded abrasives.

Coated abrasive articles generally include a flexible backing selected from paper sheet, cloth fabric, film, vulcanized fiber, and the like. Cloth is preferred in wet grinding operations, and is preferably treated with an optional back side coating and an optional front side coating. There may be no clear line of demarcation between the optional front and back side coatings, which may meet in the interior of the cloth backing, which is saturated as much as possible with the resins of those coating. Overlaying the optional front side coating, if used, may be a make coating in which are embedded abrasive particles. A size coating containing the erodable filler agglomerates may then be coated over the make coating and the abrasive particles. Coated abrasives having this construction are shown, for example, in FIGS. 1–3 of U.S. Pat. No. 5,078,753, the entirety of which is incorporated by reference herein. The erodable filler agglomerates of the current invention may be substituted for a portion of the agglomerates described therein.

In some instances coated abrasives comprise a supersize coating overlaying the size coating, and coated abrasives of this invention are no different in this respect.

In coated abrasives of the present invention, at least one of the coatings described above includes the erodable filler agglomerates of the invention. It is preferred that the erodable filler agglomerates of the invention be present in the outermost layer of coated abrasives of the invention, i.e, the size or supersize coating.

Alternatively, rather than using make and size coatings, an abrasive slurry, comprising abrasive particles, erodable filler agglomerates, binder precursor, water, and optional non-agglomerated additives and optional organic solvent, may be coated onto a backing. This coating (upon curing of the binder precursor) then serves as the abrasive layer.

Nonwoven abrasive products typically include an open, porous, lofty, filamentous structure having abrasive particles distributed throughout the structure and adherently bonded thereto by a binder. The nonwoven abrasives of the invention are preferably of like construction, substituting the binder made using the coatable mixtures of the invention described above. Nonwoven abrasive articles having this type of construction are described in U.S. Pat. No. 2,958,593, incorporated by reference herein.

Bonded abrasives incorporating the above-described erodable filler agglomerates typically consist of a shaped mass of abrasive grains held together by a binder. The shaped mass can be in any number of conventional forms such as wheels, points, discs, and cylinders, but is preferably in the form of a grinding wheel. A preferred bonded abrasive product in accordance with the present invention comprises between about 50 to about 90 weight percent abrasive grains dispersed and adhered within the binder. Bonded abrasives products are preferably manufactured by a molding process, and are made with varying degrees of porosity to control the breakdown. The "coatable" mixture in these embodiments need only be "pourable" so that the mixture can be poured into a mold or onto a surface.

Binders suitable for use in the abrasive articles must be compatible or capable of being rendered compatible with the erodable filler agglomerates, backing, and abrasive particles, and are typically thermally and/or radiation curable. Examples of suitable binders for this invention include: phenolic resins, aminoplast resins, urethane resins, epoxy resins, acrylate resins, acrylated isocyanurate resins, urea-aldehyde resins, isocyanurate resins, acrylated urethane resins, acrylated epoxy resins and mixtures thereof. One preferred resin is a thermally curable resole phenolic resin, such as described in Kirk-Othmer, *Encyclopedia of Chemical Technology*, 3rd Ed., John Wiley & Sons, 1981, N.Y., Vol. 17, p. 384–399, incorporated by reference herein. In the initial steps for making the abrasive articles of the invention, a coatable mixture of the invention comprising a binder precursor and erodable filler agglomerates is applied to a backing in an uncured or unpolymerized state. Then, during further processing, the binder precursor is cured or polymerized to form a cured binder.

Examples of commercially available phenolic resins include those known by the trade names "Varcum" and "Durez" (from Occidental Chemicals Corp., N. Tonawanda, N.Y.), and "Arofene" (from Ashland Chemical Co.).

It is contemplated that radiation energy-curable resins may be used as the binder precursor of any of the coatings described above for coated abrasive articles of the invention or for the binder in nonwoven and bonded abrasives. Examples of radiation energy-curable resins are described in U.S. Pat. Nos. 4,715,138; 4,903,440, and 4,927,431, incorporated by reference for the radiation energy-curable resins described therein.

Abrasive articles may also have release/and or load resistant coatings as supersize coatings, and may have pressure sensitive adhesive coatings on the back side, as desired. Suitable release and antiloading coatings are described in assignee's copending application Ser. No. 07/832,474, filed Feb. 7, 1992, entitled "Abrasive Articles Including a Crosslinked Siloxane, and Methods of Making and Using Same", incorporated by reference herein. Examples of suitable release coatings include crosslinked siloxanes formed from the condensation reaction product of hydrolyzed trialkoxysilane-terminated polydimethylsiloxanes. Suitable pressure sensitive adhesives for use in attaching abrasive articles to substrates are also described in that application. An example of a useful pressure sensitive adhesive is a 95.5:4.5 copolymer mixture of isooctylacrylate and acrylic acid.

The abrasive particles used in the abrasive articles of the invention may be individual abrasive grains or agglomerates of individual abrasive grains. Suitable abrasive particles for use in the present invention include those organic and inorganic particles having a Moh hardness greater than about 7, more preferably from about 9 to about 10. If agglomerated, the abrasive particles may themselves be erodable, such as disclosed in U.S. Pat. No. 4,652,275, incorporated by reference herein. The abrasive agglomerates, if used, will preferably range from 150 micrometers to 3000 micrometers in the largest dimension. If the individual abrasive grains are very fine, for example, corresponding to P 180 (FEPA-Norm), then between 10 and 1000 individual grains would be contained in each agglomerate. If the individual abrasive grains correspond to P 36, then between 2 and 20 grains would be contained in each agglomerate. If agglomerated, the abrasive particles are typically irregular in shape, but they can also be formed into spheres, spheroids, ellipsoids, pellets, rods, or other conventional shapes. Combinations of individual abrasive grains can be used along with agglomerated abrasive grains, and the proportion of individual abrasive grains employed in this manner may be as high as 70 percent of the weight of the abrasive agglomerates.

Examples of abrasive particles meeting the above and thus preferred in the practice of this invention include silicon carbide (including refractory silicon carbide such as disclosed in U.S. Pat. No. 4,505,720), aluminum oxide, alumina zirconia (including fused alumina zirconia such as disclosed in U.S. Pat. Nos. 3,781,172; 3,891,408; and 3,893,826 commercially available from the Norton Company of Worcester, Mass., under the trade designation "Norzon," cubic boron nitride, garnet, pumice, sand, emery, mica, corundum, quartz, diamond, boron carbide, fused alumina, sintered alumina, alpha alumina-based ceramic material (available from Minnesota Mining and Manufacturing Company, St. Paul, Minn., under the trade designation "Cubitron") as disclosed in U.S. Pat. Nos. 4,314,827; 4,518,397; 4,574,003; 4,770,671; 4,744,802; and 4,881,451 and combinations thereof. The preferred abrasive particles are aluminum oxide and silicon carbide.

The abrasive articles of the present invention may also include nonabrasive or less abrasive inorganic diluent grains as disclosed in U.S. Pat. No. 5,011,512, i.e., nonabrasive inorganic diluent grains having a hardness less than 200 on the Knoop Hardness Scale. Useful nonabrasive diluent grain include limestone and gypsum, as discussed in columns 6 and 7 of the '512 patent, incorporated by reference herein.

The following non-limiting examples will further illustrate the invention. All formulation percentages and parts are based upon weight. The phenolic resole resin used in each case was based on a 1.7:1 formaldehyde to phenol ratio, 76 weight percent solids resin. Where used, "aluminum sulfate" refers to $Al_2(SO_4)_3 \cdot 14$–$18$-$H_2O$.

EXAMPLES

General Procedure For Making Coated Abrasives (I)

For the following examples made using this procedure, the backing of each coated abrasive consisted of a Y weight woven polyester cloth which had a four over one weave. Each backing was saturated with a latex/phenolic resin and then placed in an oven to partially cure this resin. Next, a calcium carbonate-filled latex/phenolic resin pretreatment coating was applied to the back side of each backing. Each coated backing was heated to about 120° C. and maintained at this temperature until the resin had cured to a tack-free state. Finally, a pretreatment coating of latex/phenolic resin was applied to the front side of each coated backing and each coated backing was heated to about 120° C. and maintained at this temperature until the resin had precured to a tack-free state. Each backing made by this procedure was completely pretreated and was ready to receive a make coat.

A coatable mixture for making a make coating for each coated backing was prepared by mixing 69 parts of 70% solids phenolic resin (48 parts phenolic resin), 52 parts non-agglomerated calcium carbonate filler (dry weight basis), and enough of a solution of 90 parts water/10 parts ethylene glycol monoethyl ether to form a make coating in each case which was 84% solids, with a final coating weight of 230 $g/m^2$. The make coating was applied in each case via two-roll coating. (It will be appreciated that other coating methods, such as knife coating, curtain coating, spray coating, and the like, may have been used as well. Also, the number of rolls in roll coating is not required to be two.)

Next, grade 40 (ANSI standard B74.18 average particle size of 420 micrometers) heat-treated aluminum oxide abrasive particles were electrostatically coated onto the uncured make coatings with a weight of 760 $g/m^2$.

Then the resulting constructions were heated for 15 minutes at 65° C. to partially cure the make coating followed by further heating at 88° C. for 75 minutes. An 82% solids coatable mixture suitable for forming a size coating (having the compositions described in the following examples) was then applied to each coated abrasive via two-roll coating method over the abrasive particles/make coat construction. The resulting coated abrasives received a thermal cure of 90 minutes at 88° C. followed by 12 hours at 100° C.

After this thermal cure, the coated abrasives were single flexed (i.e. passed over a roller at an angle of 90° to allow a controlled cracking of the make and size coatings).

General Procedure for Making Coated Abrasives (II)

The following examples that did not use General Procedure for Making Coated Abrasives (I) used the following procedure. The pretreated backing of each of the coated abrasives made according to the General Procedure for Making Coated Abrasives (II) was the same as the pretreated backing described above under the heading General Procedure for Making Coated Abrasives (I).

A coatable mixture suitable for producing a make coat for each coated backing was prepared by mixing 69 parts of 70% solids phenolic resin (48 parts phenolic resin), 13.5 parts titanium dioxide filler, 38.5 parts calcium carbonate filler, and enough of a solution of 90 parts water/10 parts ethylene glycol monoethyl ether to form a make coating which was 84% solids which was coated via a two-roll coater to achieve a cured coating weight of about 140 $g/m^2$.

Next, grade 40 (ANSI standard B74.18 average particle size of 420 micrometers) heat treated aluminum oxide abrasive particles were electrostatically coated onto the uncured make coating with a weight of 760 $g/m^2$.

Then the resulting constructions received a precure of 15 minutes at 65° C., followed by 75 minutes at 88° C. A 82% solids coatable mixture suitable for forming a size coating (having the compositions described in the following examples) was then applied over the abrasive particles/make coat construction via two-roll coater. The size coating weight in each case was about 280 $g/m^2$. The resulting coated abrasives received a thermal cure of 30 minutes at 88° C. followed by 12 hours at ·100° C. After this thermal cure, the coated abrasives were flexed as in General Procedure for Making the Coated Abrasive I.

Test Procedure I (Wet Grinding)

The coated abrasive material was attached to the periphery of a 36 cm diameter metal wheel. The effective cutting area of the abrasive segment was 2.54 cm by 109 cm. The workpiece abraded by these segments was 1018 steel, 1.27 cm width by 36 cm length by 7.6 cm height. Abrading was conducted along the 1.27 cm by 36 cm face. The workpiece was mounted on a reciprocating table, while the metal wheel speed was 1500 rpm or 1674 surface meters per minute. The table speed at which the workpiece traversed was 9 meters/minute. The down feed increment of the wheel was about 45 micrometers/pass of the workpiece. This abrading process emulated conventional wet surface grinding wherein the workpiece was reciprocated beneath the rotating contact wheel with incremental down feeding between each pass. The grinding was carried out under a water flood, and the test endpoint was when the normal force exceeded 12.6 kg/cm$^2$. The amount of workpiece removed by each coated abrasive example was measured and recorded in grams.

Test Procedure II (Dry Grinding)

The coated abrasive was converted into a 7.6 cm by 335 cm endless belt and installed on a constant load surface grinder. A preweighed, 304 stainless steel workpiece (approximately 2.5 cm by 5 cm by 18 cm) was mounted in a holder and was positioned vertically with the 2.5 cm by 18 cm face confronting an approximately 36 cm diameter 85 Shore A durometer serrated rubber contact wheel with one to one land to groove ratio, over which was entrained the coated abrasive belt. The workpiece was then reciprocated vertically through a 18 cm path at the rate of 20 cycles per minute, while a spring loaded plunger forced the workpiece against the belt with a load of 11 kg as the belt was driven at about 2050 meters per minute. After one minute of elapsed grinding time, the workpiece holder assembly was removed and reweighed. The amount of workpiece removed was calculated by subtracting the weight of the workpiece after abrasion from its original weight. Then a new, preweighed workpiece and holder were mounted on the equipment. The test endpoint was 5 minutes. The experimental error on this test was +/−10%.

Test Procedure III (Dry Grinding)

The test method of Test Procedure III was essentially the same as Test Procedure II except that the workpiece being abraded was 4150 steel, and the test endpoint was when the amount of 4150 steel removed was less than 40 grams in a one minute interval.

Test Procedure IV (Wet Grinding)

The test method of Test Procedure IV was essentially the same as Test Procedure I except for the following changes. The table speed at which the workpiece traversed was about 12 meters/minute. The down feed increment of the wheel was about 40 micrometers/pass of the workpiece. The test endpoint was when the normal force exceeded 14 kg/cm$^2$.

Test Procedure V (Dry Grinding)

The test method of Test Procedure V was essentially the same as Test Procedure I except for the following changes. The table speed at which the workpiece traversed was about 18 meters/minute. The down feed increment of the wheel was about 50 micrometers/pass of the workpiece. The grinding was done dry, i.e., there was no water flood. The test endpoint was when the coated abrasive began to shell, i.e., the premature release of the abrasive grains.

Test Procedure VI (Wet Grinding)

The test method of Test Procedure VI was essentially the same as Test Procedure IV except for the following changes. The table speed at which the workpiece traversed was about 18 meters/minute. The test endpoint was either shelling or when the normal force exceeded 14 kg/cm$^2$.

Test Procedure VII (Wet Grinding)

The test method of Test Procedure VII was essentially the same as Test Procedure I except for the following changes. The table speed at which the workpiece traversed was about 12 meters/minute. The down feed increment of the wheel was about 50 micrometers/pass of the workpiece. The test endpoint was when the normal force exceeded 11.8 kg/cm$^2$.

CONTROL EXAMPLES A & b, EXAMPLE 1

The coated abrasives for this set of Examples were made according to the General Procedure for Making Coated Abrasives (I). The size coating in each case was prepared by mixing, in addition to resin and filler, enough of a 90 parts water/10 parts ethylene glycol monoethyl ether solution to make an 82% solids size coat, with a final coating weight of about 300 g/m$^2$. The size coating for Control Example A included 69 parts of 70% solids phenolic resin (48 parts phenolic resin), and 52 parts calcium carbonate filler. The size coating for Control Example B included 52 parts cryolite and 69 parts of 70% solids resole phenolic resin (48% phenolic resin). The size coating for Example 1 included 49.4 parts cryolite, agglomerated by the addition of 2.6 parts aluminum sulfate, and 48 parts resole phenolic resin, each on a dry weight basis. For Example 1 the aluminum sulfate was added directly to the phenolic resin as a solid. These coated abrasives were tested under Test Procedure I and Test Procedure II. The results can be found in Tables 1 and 2 respectively.

TABLE 1

| (Test Procedure I, Wet Grinding) | |
| --- | --- |
| Example | Workpiece removed (gms) |
| Control A | 700 |
| Control B | 696 |
| 1 | 1315 |

TABLE 2

| (Test Procedure II, Dry Grinding) | |
| --- | --- |
| Example | Workpiece removed (gms) |
| Control A | 111 |
| Control B | 124 |
| 1 | 141 |

CONTROL EXAMPLES A & C, EXAMPLES 2 TO 6

The coated abrasives for this set of Examples were made according to the General Procedure for Making Coated Abrasives (I). The size coating for Control Example A was the same as described above.

The size coating for Control Example C included 52 parts cryolite and 48 parts resole phenolic resin, each on a dry weight basis and the size coating weight was 330 g/m$^2$.

The size coating for Example 2 included 49.4 parts cryolite, agglomerated by the addition of 2.6 parts aluminum sulfate and 48 parts resole phenolic resin, all on a dry weight basis, and the size coating weight was 306 g/m$^2$.

The size coating for Example 3 consisted of 49.9 parts cryolite, agglomerated by the addition of 2.1 parts aluminum sulfate, and 48 parts resole phenolic resin, all on dry weight basis, and the size coating weight was 306 g/m².

The size coating for Example 4 consisted of 50.4 parts cryolite, agglomerated by the addition of 1.6 part aluminum sulfate and 48 parts resole phenolic resin (dry weight basis), and the size coat weight was 293 g/m². The size coating for Example 5 consisted of 51 parts cryolite, agglomerated with 1.0 part aluminum sulfate, and 48 parts resole phenolic resin, and the size coating weight was 311 g/m².

The size coating for Example 6 consisted of 51.5 parts cryolite, agglomerated with 0.5 part aluminum sulfate, and 48 parts resole phenolic resin, and the size coating weight was 297 g/m².

For Examples 2-6 the aluminum sulfate was added directly to the phenolic resin as a solid. In each size coating, enough of a 90/10 water/ethylene glycol monoethyl ether solution was added to form an 82% solids solution. These coated abrasives were tested under Test Procedure I and Test Procedure II. The results can be found in Tables 3 and 4 respectively.

Additionally, the coated abrasives made according to Control Example C and Example 2 were tested under the Test Procedure III and the results can be found in Table 5.

TABLE 3

| (Test Procedure I, Wet Grinding) | |
| --- | --- |
| Example | Workpiece removed (gms) |
| Control A | 751 |
| Control C | 816 |
| 2 | 1103 |
| 3 | 1125 |
| 4 | 1031 |
| 5 | 1075 |
| 6 | 784 |

TABLE 4

| (Test Procedure II, Dry Grinding) | |
| --- | --- |
| Example | Workpiece removed (gms) |
| Control A | 119 |
| 2 | 142 |
| 3 | 134 |
| 4 | 129 |
| 5 | 128 |
| 6 | 124 |

TABLE 5

| (Test Procedure III, Dry Grinding) | |
| --- | --- |
| Example | Workpiece removed (gms) |
| Control C | 1754 |
| 2 | 1864 |

CONTROL EXAMPLES D & E; EXAMPLES 7 THROUGH 9

The coated abrasives for this set of examples were tested according to Test Procedures IV, V, VI and VII. The abrading results can be found in Tables 6, 7, 8 and 9 respectively.

Control Example D coated abrasive was a grade 40 Resin Bond Cloth Type ZB coated abrasive known under the trade name "Three-M-ite" commercially available from the Minnesota Mining and Manufacturing Company, St. Paul, Minn. This particular coated abrasive contained calcium carbonate in the size coating and did not contain cryolite in the size coating.

The coated abrasives for Control Example E and Examples 7 through 9 were made according to the General Procedure For Making Coated Abrasives (I) except that the make coating weight was about 140 g/m².

The size coating weight for Control E and Examples 7 through 9 was about 275 g/m².

The size coating for Control Example E consisted of 52 parts cryolite and 48 parts resole phenolic resin (dry weight basis).

The size coating for Example 7 consisted of 51.5 parts cryolite, 0.5 part aluminum sulfate and 48 parts resole phenolic resin (dry weight basis).

The size coating for Example 8 consisted of 51.0 parts cryolite, 1.0 part aluminum sulfate and 48 parts resole phenolic resin (dry weight basis).

The size coating for Example 9 consisted of 50.4 parts cryolite, 1.6 part aluminum sulfate and 48 parts resole phenolic resin (dry weight basis).

For Examples 7 through 9, the aluminum sulfate was added to the cryolite/phenolic resin/solvent suspension as a 41.7% aqueous solution, and enough of a 90/10 water/ethylene glycol monoethyl ether solution was added to form an 82% solids size coating solution.

Coated abrasives D, E, and 7-9 were tested in accordance with Test Procedures IV-VII, with the results presented in Tables 6-9, respectively.

TABLE 6

| (Test Procedure IV, Wet Grinding) | |
| --- | --- |
| Example | Workpiece removed (gms) |
| Control D | 701 |
| Control E | 666 |
| 7 | 1198 |
| 8 | 1272 |
| 9 | 1194 |

TABLE 7

| (Test Procedure V, Dry Grinding) | |
| --- | --- |
| Example | Workpiece removed (gms) |
| Control D | 848 |
| Control E | 873 |
| 7 | 1521 |
| 8 | 1395 |
| 9 | 1511 |

TABLE 8

| (Test Procedure VI, Wet Grinding) | |
| --- | --- |
| Example | Workpiece removed (gms) |
| Control D | 404 |
| Control E | 435 |
| 7 | 693 |
| 8 | 653 |
| 9 | 559 |

TABLE 9

| (Test Procedure VII, Wet Grinding) | |
| --- | --- |
| Example | Workpiece removed (gms) |
| Control D | 668 |
| Control E | 674 |
| 7 | 1058 |
| 8 | 1045 |
| 9 | 1036 |

CONTROL EXAMPLES D & F; EXAMPLES 10 THROUGH 12

The coated abrasives for Control Example F and Examples 10 through 12 were made according to the General Procedure for Making Coated Abrasives (II). The size coating for Control Example E included 52 parts cryolite and 48 parts resole phenolic resin; the size coating for Example 10 included 51.5 parts cryolite, 0.5 part aluminum sulfate and 48 parts resole phenolic resin; the size coating for Example 11 included 51.0 parts cryolite, 1.0 part aluminum sulfate and 48 parts resole phenolic resin; and the size coating for Example 12 consisted of 50.4 parts cryolite, 1.6 part aluminum sulfate and 48 parts resole phenolic resin (dry weight basis in each case). For Examples 10 through 12, the aluminum sulfate was added to the cryolite/phenolic resin/solvent suspension as a 41.7% aqueous solution, and enough of a 90/10 water/ethylene glycol monoethyl ether solution was added in each case to form an 82% solids size coating solution.

The coated abrasives for this set of examples were tested according to Test Procedure IV, V, VI and VII. The abrading results can be found in Tables 10, 11, 12 and 13 respectively.

TABLE 10

(Test Procedure IV, Wet Grinding)

| Example | Workpiece removed (gms) |
| --- | --- |
| Control D | 701 |
| Control F | 742 |
| 10 | 1663 |
| 11 | 1590 |
| 12 | 1355 |

TABLE 11

(Test Procedure V, Dry Grinding)

| Example | Workpiece removed (gms) |
| --- | --- |
| Control D | 848 |
| Control F | 969 |
| 10 | 1548 |
| 11 | 1697 |
| 12 | 1251 |

TABLE 12

(Test Procedure VI, Wet Grinding)

| Example | Workpiece removed (gms) |
| --- | --- |
| Control D | 404 |
| Control F | 457 |
| 10 | 713 |
| 11 | 774 |
| 12 | 665 |

TABLE 13

(Test Procedure VII, Wet Grinding)

| Example | Workpiece removed (gms) |
| --- | --- |
| Control D | 668 |
| Control F | 627 |
| 10 | 1135 |
| 11 | 1165 |
| 12 | 1042 |

CONTROL EXAMPLES B AND D AND EXAMPLES 13 THROUGH 37

This set of examples compared the performance of coated abrasives which contained various sulfate salts as water soluble filler in the size coating. The coated abrasives were made according to the General Procedure for Making Coated Abrasives (I), except that the make coating weight was about 170 g/m$^2$ in each case. The size coating contained 48 parts resole phenolic resin and 52 parts sulfate salt/cryolite in each case (dry weight basis). The weight percentages of the sulfate salt and cryolite, along with the size coating weight can be found in Table 14.

For Examples 13 through 18 the sulfate salt was sodium sulfate ($Na_2SO_4$).

For Examples 19 through 22 the sulfate salt was aluminum sulfate [$Al_2(SO_4)_3 \cdot 14-18H_2O$].

For Example 23 the sulfate salt was ammonium sulfate [$(NH_4)_2SO_4$].

For Example 24 the sulfate salt was ammonium bisulfate ($NH_4HSO_4$).

For Examples 25 and 26 the sulfate salt was nickel sulfate ($NiSO_4 \cdot 6H_2O$).

For Examples 27 and 28 the sulfate salt was zinc sulfate ($ZnSO_4 \cdot 7H_2O$).

For Examples 29 and 30 the sulfate salt was iron sulfate ($FeSO_4 \cdot 7H_2O$).

For Examples 31 and 32 the sulfate salt was copper sulfate ($CuSO_4 \cdot 5H_2O$).

For Examples 33 and 34 the sulfate salt was magnesium sulfate ($MgSO_4$).

For Examples 35 through 37 the sulfate salt was lithium sulfate ($Li_2SO_4 \cdot H_2O$).

In each Example B, D, 13-29 and 23-37, the solvent used was a 90/10 water/ethylene glycol monoethyl ether solution; in Examples 21 and 22, a 90/10 parts solution of water/propylene glycol monomethyl ether was employed to form an 82% solids size coating solution. The coated abrasives were tested according to Test Procedure VI (Wet Grinding) and the results can be found in Table 14.

TABLE 14

| Example (gms) | % sulfate salt/ % cryolite | size coat weight (gms/m$^2$) | workpiece removed |
| --- | --- | --- | --- |
| Control B | 0/52 | 420 | 471 |
| Control D | 0/52 | 220* | 495 |
| 13 | 0.5/51.5 | 402 | 457 |
| 14 | 1.0/51.0 | 430 | 534 |
| 15 | 1.6/50.4 | 390 | 672 |
| 16 | 2.1/49.9 | 410 | 506 |
| 17 | 2.6/49.4 | 400 | 567 |
| 18 | 3.2/48.8 | 385 | 623 |
| 19 | 0.5/51.5 | 410 | 495 |
| 20 | 1.0/51.0 | 410 | 517 |
| 21 | 0.5/51.5 | 400 | 656 |
| 22 | 1.0/51.0 | 400 | 551 |
| 23 | 0.5/51.5 | 395 | 578 |
| 24 | 0.5/51.5 | 400 | 559 |
| 25 | 0.5/51.5 | 385 | 634 |
| 26 | 1.0/51.0 | 390 | 541 |
| 27 | 0.5/51.5 | 380 | 708 |
| 28 | 1.0/51.0 | 380 | 581 |
| 29 | 0.5/51.5 | 370 | 680 |
| 30 | 1.0/51.0 | 365 | 649 |
| 31 | 0.5/51.5 | 390 | 605 |
| 32 | 1.0/51.0 | 370 | 696 |
| 33 | 0.5/51.5 | 360 | 618 |
| 34 | 1.0/51.0 | 365 | 641 |
| 35 | 0.5/51.5 | 385 | 544 |
| 36 | 1.0/51.0 | 390 | 584 |
| 37 | 1.6/50.4 | 390 | 559 |

*Indicates dry coating weight

Various modifications and alterations of this invention will become apparent to those skilled in the art without departing from the scope and spirit of this invention, and it should be understood that this invention is not to be unduly limited to illustrated embodiments set forth herein.

What is claimed is:

1. A coatable mixture comprising erodable filler agglomerates and a binder precursor, the mixture being suitable for use in making an abrasive article, the erodable filler agglomerates comprising a plurality of individual particles of water insoluble filler agglomerated by an agglomerating agent consisting essentially of water soluble filler and binder precursor, said water soluble filler being no more than about 10 weight percent of the total weight of water soluble and water insoluble fillers.

2. Coatable mixture in accordance with claim 1 wherein said water insoluble filler comprises materials selected from the group consisting essentially of inorganic halide salts represented by the general formula $$(A)_y(III_a)(X)_z$$

having a solubility in cold water of at most about 10 gms/100 cc and mixtures thereof wherein:
A = alkali metal ion, ammonium ion, or combinations thereof;
$III_a$ = $Al^{3+}$, $Ga^{3+}$, or combinations thereof;
X = halide ion or combinations thereof;
y = an integer from 1 to 10; and
z = y + 3.

3. Coatable mixture in accordance with claim 1 wherein said water soluble filler comprises materials selected from the group consisting essentially of inorganic compounds represented by the general formula $$B_n{}^{m+}C_m{}^{n-}\cdot hH_2O$$

having a solubility in cold water of at least about 10 gms/100 cc, and mixtures thereof wherein:
B = Al, $NH_4$, Ni, Zn, Fe, Cu, Mg, alkali metal, or combinations thereof;
C = $HSO_4$, $SO_4$, $NO_3$, $PO_4$, $HPO_4$, $H_2PO_4$, $BF_4$, or combinations thereof;
n = an integer from 1 to 5;
m = 5 − n; and
h = an integer ranging from about 0 to about 20.

4. Coatable mixture in accordance with claim 1 wherein the weight percent of water soluble filler is no more than about 2.5 weight percent of the total weight of said water soluble and water insoluble fillers.

5. Coatable mixture in accordance with claim 1 wherein the weight percent of water soluble filler is no more than about 1.0 weight percent of the total weight of said water soluble and water insoluble fillers.

6. Coatable mixture in accordance with claim 2 wherein A is $Na^+$.

7. Coatable mixture in accordance with claim 6 wherein X is $F^-$, y = 3, and z = 6.

8. Coatable mixture in accordance with claim 3 wherein C is $SO_4$.

9. Coatable mixture in accordance with claim 8 wherein B is selected from the group consisting of Al, Ni, and Zn or mixtures thereof.

10. Coatable mixture in accordance with claim 9 wherein said water insoluble filler is $Na_3AlF_6$.

11. A coated abrasive article comprising a cured version of the coatable mixture of claim 1.

12. A coated abrasive article in accordance with claim 11, wherein the erodable filler agglomerates are dispersed in a size coating.

13. A coated abrasive article in accordance with claim 12 comprising a make coating comprising from about 5 to about 20 weight percent, on a dry weight basis of, titanium dioxide ($TiO_2$).

14. A bonded abrasive article comprising a cured version of the coatable mixture of claim 1.

15. A nonwoven abrasive article comprising a cured version of the coatable mixture of claim 1.

16. An abrasive article comprising a plurality of erodable filler agglomerates and a plurality of abrasive particles, both of said erodable filler agglomerates and said abrasive particles dispersed throughout and adhered within a binder which is attached to a backing, said erodable filler agglomerates comprising a plurality of individual particles of water insoluble filler agglomerated by an agglomerating agent, said agglomerating agent consisting essentially of water soluble filler and binder, said water soluble filler being no more than about 10.0 weight percent of the total weight of water soluble and water insoluble fillers.

17. An abrasive article in accordance with claim 16 wherein the article is a coated abrasive article comprising make and size coatings, and wherein the size coating comprises (dry weight basis) from about 30 to about 60 weight percent water insoluble filler, from about 30 to about 60 weight percent binder, and less than about 10 weight percent water soluble filler.

18. An abrasive article in accordance with claim 16 wherein the binder comprises a cured organic resin, the organic resin selected from the group consisting of phenolic resins, aminoplast resins, urethane resins, epoxy resins, acrylate resins, acrylated isocyanurate resins, urea-aldehyde resins, isocyanurate resins, acrylated urethane resins, acrylated epoxy resins, and mixtures thereof.

19. An abrasive article in accordance with claim 16 wherein said water soluble filler comprises materials selected from the group consisting essentially of inorganic compounds represented by the general formula $$B_n{}^{m+}C_m{}^{n-}\cdot hH_2O$$

having a solubility in cold water of at least about 10 gms/100 cc, and mixtures thereof wherein:
B = Al, $NH_4$, Ni, Zn, Fe, Cu, Mg, alkali metal, or combinations thereof;
C = $HSO_4$, $SO_4$, $NO_3$, $PO_4$, $HPO_4$, $H_2PO_4$, $BF_4$, or combinations thereof;
n = an integer from 1 to 5;
m = 5 − n; and
h = an integer ranging from about 0 to about 20.

20. An abrasive article in accordance with claim 19 wherein said water insoluble filler comprises $Na_3AlF_6$.

21. Method of preparing a coatable mixture comprising erodable filler agglomerates and binder precursor, the mixture suitable for use in making an abrasive article, said erodable filler agglomerates comprising a plurality of individual particles of water insoluble filler agglomerated by an agglomerating agent, the agglomerating agent consisting essentially of water soluble filler and binder precursor, said method comprising the steps of:

(a) mixing water soluble filler with a sufficient amount of water and at a temperature sufficient to dissolve at least a portion of the water soluble filler to form a solution comprising the water soluble filler;

(b) separately combining water insoluble filler, binder precursor, and water in proportions and at a temperature sufficient to form a dispersion comprising the water insoluble filler;

(c) combining the solution of step (a) with the dispersion of step (b) to form a coatable mixture from which erodable filler agglomerates will form; and (d) allowing the formation of erodable filler agglomerates in situ in said coatable mixture, said erodable filler agglomerates comprising a plurality of said water insoluble filler agglomerated by an agglomerating agent consisting essentially of water soluble filler and binder precursor, wherein the water soluble filler is no more than about 10 weight percent of the total weight of water soluble and water insoluble fillers.

22. The method of claim 21 wherein the water soluble filler comprises materials selected from the group consisting essentially of inorganic compounds represented by the general formula $$B_n{}^{m+}C_m{}^{n-}\cdot hH_2O$$

having a solubility in cold water of at least about 10 gms/100 cc, and mixtures thereof wherein:
- B = Al, NH$_4$, Ni, Zn, Fe, Cu, Mg, alkali metal, or combinations thereof;
- C = HSO$_4$, SO$_4$, NO$_3$, PO$_4$, HPO$_4$, H$_2$PO$_4$, BF$_4$, or combinations thereof;
- n = from 1 to 5;
- m = 5 − n; and
- h = an integer ranging from about 0 to about 20.

23. The method of claim 22 wherein the water insoluble filler comprises materials selected from the group consisting essentially of inorganic halide salts represented by the general formula $$(A)_y(III_a)(X)_z$$

having a solubility in cold water of at most about 10 gms/100 cc, and mixtures thereof wherein:
- A = alkali metal ion, ammonium ion, or combinations thereof;
- III$_a$ = Al$^{3+}$, Ga$^{3+}$, or combination thereof;
- X = halide ion or combinations thereof;
- y = a number from 1 to 10; and
- z = y + 3.

24. The method of claim 23 wherein A = Na$^+$, X = F$^-$, y = 3, z = 6, B = Al, C = SO$_4$, n = 2, and m = 3.

25. The method of claim 21 which further comprises step (e) adding abrasive grains to the coatable mixture of step (d) to form a coatable abrasive slurry.

26. The method of claim 21 which further comprises step (e) diluting the coatable mixture of step (d) with sufficient organic solvent to render the coatable mixture filterable, and step (f) separating the erodable filler agglomerates from the coatable mixture by passing the coatable mixture through means for filtering.

27. A method of making a coated abrasive article comprising coating one side of a backing with a make coating, applying to the make coating a plurality of abrasive particles, subjecting the make coating to conditions which partially cure the make coating, coating the resulting structure with the coatable mixture prepared by the process of claim 21 to form a size coating, and subjecting the size coating and make coating to conditions which cure the make coating and size coating.

28. A method of making a coated abrasive article comprising coating one side of a backing with the coatable abrasive slurry of claim 25 and subjecting the coated backing to conditions which cure the binder precursor.

29. Erodable filler agglomerates comprising a plurality of individual particles of water insoluble filler agglomerated by an agglomerating agent consisting essentially of water soluble filler and binder, wherein the water soluble filler is no more than about 10 weight percent of the total weight of water soluble and water insoluble fillers.

30. Agglomerate in accordance with claim 29 wherein said water insoluble filler comprises materials selected from the group consisting essentially of inorganic halide salts represented by the general formula $$(A)_y(III_a)(X)_z$$

having a solubility in cold water of at most about 10 gms/100 cc, and mixtures thereof wherein:
- A = alkali metal ion, ammonium ion, or combinations thereof;
- X = halide ion or combination thereof;
- y = an integer from 1 to 10; and
- z = y + 3.

31. An agglomerate in accordance with claim 29 wherein said water soluble filler comprises materials selected from the group consisting essentially of inorganic compounds represented by the general formula $$B_n{}^{m+}C_m{}^{n-}\cdot hH_2O$$

having a solubility in cold water of at least about 10 gms/100 cc, and mixtures thereof wherein:
- B = Al, NH$_4$, Ni, Zn, Fe, Cu, Mg, alkali metal, or combinations thereof;
- C = HSO$_4$, SO$_4$, NO$_3$, PO$_4$, HPO$_4$, H$_2$PO$_4$, BF$_4$, or combinations thereof;
- n = an integer from 1 to 5;
- m = 5 − n; and
- h = an integer ranging from about 0 to about 20.

32. Agglomerate in accordance with claim 31 wherein C = SO$_4$.

33. Agglomerate in accordance with claim 32 wherein B is selected from the group consisting of Al, Ni or Zn.

34. Agglomerates in accordance with claim 33 wherein said water insoluble filler is Na$_3$AlF$_6$.

35. A coatable mixture comprising erodable filler agglomerates and a binder precursor, the mixture being suitable for use in making an abrasive article, the erodable filler agglomerates comprising a plurality of individual particles of water insoluble filler agglomerated by an agglomerating agent, said water insoluble filler selected from the group consisting essentially of cryolite, cryolite derivatives, and mixtures thereof, and said agglomerating agent consisting essentially of a water soluble filler and binder precursor, said water soluble filler selected from the group consisting essentially of Al$_2$(SO$_4$)$_3$, Al$_2$(SO$_4$)$_3\cdot$14–18H$_2$O, and mixtures thereof, said water soluble filler being no more than about 10 weight percent of the total weight of water soluble filler and water insoluble filler.

36. Coatable mixture in accordance with claim 35 wherein the weight percent of water soluble filler is no more than about 2.5 weight percent of the total weight of said water soluble filler and said water insoluble filler.

37. Coatable mixture in accordance with claim 35 wherein the weight percent of water soluble filler is no more than about 1.0 weight percent of the total weight of said water soluble filler and said water insoluble filler.

38. A coated abrasive article comprising a cured version of the coatable mixture of claim 35.

39. A coated abrasive article in accordance with claim 38, wherein the erodable filler agglomerates are dispersed in a size coating.

40. A coated abrasive article in accordance with claim 39 comprising a make coating comprising from about 5 to about 20 weight percent, on a dry weight basis of, titanium dioxide ($TiO_2$).

41. A bonded abrasive article comprising a cured version of the coatable mixture of claim 35.

42. A nonwoven abrasive article comprising a cured version of the coatable mixture of claim 35.

43. Method of preparing a coatable mixture comprising erodable filler agglomerates and binder precursor, the mixture suitable for use in making an abrasive article, said erodable filler agglomerates comprising a plurality of individual particles of water insoluble filler agglomerated by an agglomerating agent, the agglomerating agent consisting essentially of water soluble filler and binder precursor, the water soluble filler selected from the group consisting essentially of $Al_2(SO_4)_3$, $Al_2(SO_4)_3.14-18H_2O$, and mixtures thereof, and the water insoluble filler selected from the group consisting essentially of cryolite, cryolite derivatives, and mixtures thereof, said method comprising the steps of:

(a) mixing water soluble filler with a sufficient amount of water and at a temperature sufficient to dissolve at least a portion of the water soluble filler to form a solution comprising the water soluble filler;

(b) separately combining water insoluble filler, binder precursor, and water in proportions and at a temperature sufficient to form a dispersion comprising the water insoluble filler;

(c) combining the solution of step (a) with the dispersion of step (b) to form a coatable mixture from which erodable filler agglomerates will form; and (d) allowing the formation of erodable filler agglomerates in situ in said coatable mixture, said erodable filler agglomerates comprising a plurality of said water insoluble filler agglomerated by an agglomerating agent consisting essentially of water soluble filler and binder precursor, wherein the water soluble filler is no more than about 10 weight percent of the total weight of water soluble and water insoluble fillers.

44. The method of claim 43 which further comprises step (e) adding abrasive grains to the coatable mixture of step (d) to form a coatable abrasive slurry.

45. The method of claim 43 which further comprises step (e) diluting the coatable mixture of step (d) with sufficient organic solvent to render the coatable mixture filterable, and step (f) separating the erodable filler agglomerates from the coatable mixture by passing the coatable mixture through means for filtering.

46. A method of making a coated abrasive article comprising coating one side of a backing with a make coating, applying to the make coating a plurality of abrasive particles, subjecting the make coating to conditions which partially cure the make coating, coating the resulting structure with the coatable mixture prepared by the process of claim 43 to form a size coating, and subjecting the size coating and make coating to conditions which cure the make coating and size coating.

47. A method of making a coated abrasive article comprising coating one side of a backing with the coatable abrasive slurry of claim 44 and subjecting the coated backing to conditions which cure the binder precursor.

48. Erodable filler agglomerates comprising a plurality of individual particles of water insoluble filler agglomerated by an agglomerating agent consisting essentially of water soluble filler and binder, wherein the water soluble filler is no more than about 10 weight percent of the total weight of water soluble and water insoluble fillers, the water soluble filler is selected from the group consisting essentially of $Al_2(SO_4)_3$, $Al_2(SO_4)_3.14-18H_2O$, and mixtures thereof, and said water insoluble filler is selected from the group consisting essentially of cryolite, cryolite derivatives, and mixtures thereof.

* * * * *

UNITED STATES PATENT AND TRADEMARK OFFICE
CERTIFICATE OF CORRECTION

PATENT NO. : 5,269,821
DATED : December 14, 1993
INVENTOR(S) : Harvey J. Helmin
Walter L. Harmer It is certified that error appears in the above-identified patent and that said Letters Patent is hereby corrected as shown below:

Col. 2, line 18, before "594,104", insert --07/--.

Col. 4, line 53, replace "1to" with --1 to--.

In each instance of "$B_n^{m+}C_m^{n-}.hH_2O$", substitute with --$B_n^{m+}C_m^{n-} \bullet hH_2O$--.

In each instance of "$Al_2(SO_4)_3.14-18H_2O$", substitute with --$Al_2(SO_4)_3 \bullet 14-18H_2O$--.

Col. 9, Table A, "$Al_2(SO_4)_3.18H_2O$", substitute with --$Al_2(SO_4)_3 \bullet 18H_2O$--.

Col. 9, Table A, "$Al(NO_3)_3.9H_2O$", substitute with --$Al(NO_3)_3 \bullet 9H_2O$--.

Col. 9, Table A, "$CuSO_4.5H_2O$", substitute with --$CuSO_4 \bullet 5H_2O$--.

Col. 9, Table A, "$FeSO_4 5H_2O$", substitute with --$FeSO_4 \bullet 5H_2O$--.

Col. 9, Table A, "$FeSO_4.7H_2O$", substitute with --$FeSO_4 \bullet 7H_2O$--.

Col. 9, Table A, "$Li_2SO_4.H_2O$", substitute with --$Li_2SO_4 \bullet H_2O$--.

Col. 9, Table A, "$MgSO_4.7H_2O$", substitute with --$MgSO_4 \bullet 7H_2O$--.

UNITED STATES PATENT AND TRADEMARK OFFICE
CERTIFICATE OF CORRECTION

PATENT NO. : 5,269,821
DATED : December 14, 1993
INVENTOR(S) : Harvey J. Helmin
Walter L. Harmer It is certified that error appears in the above-identified patent and that said Letters Patent is hereby corrected as shown below:

Col. 9, Table A, "$(NH_4)_3PO_4.3H_2O$", substitute with --$(NH_4)_3PO_4 \bullet 3H_2O$--.

Col. 9, Table A, "$Ni(NO_3)_2.6H_2O$", substitute with --$Ni(NO_3)_2 \bullet 6H_2O$--.

Col. 9, Table A, "$NiSO_4.6H_2O$", substitute with --$NiSO_4 \bullet 6H_2O$--.

Col. 9, Table A, "$NiSO_4.7H_2O$", substitute with --$NiSO_4 \bullet 7H_2O$--.

Col. 9, Table A, "$Na_2SO_4.7H_2O$", substitute with --$Na_2SO_4 \bullet 7H_2O$--.

Col. 9, Table A, "$Na_2SO_410H_2O$", substitute with --$Na_2SO_4 \bullet 10H_2O$--.

Col. 9, Table A, "$Zn(NO_3)_4.5H_2O$", substitute with --$Zn(NO_3)_4 \bullet 5H_2O$--.

Col. 9, Table A, "$ZnSO_4.7H_2O$", substitute with --$ZnSO_4 \bullet 7H_2O$--.

Col. 9, Table A, "$Na_2HPO_4.2H_2O$", substitute with --$Na_2HPO_4 \bullet 2H_2O$--.

Col. 11, line 38, "t", substitute with --to--.

UNITED STATES PATENT AND TRADEMARK OFFICE
CERTIFICATE OF CORRECTION

PATENT NO. : 5,269,821
DATED : December 14, 1993
INVENTOR(S) : Harvey J. Helmin
              Walter L. Harmer It is certified that error appears in the above-indentified patent and that said Letters Patent is hereby corrected as shown below:

Col. 18, line 14, "A & b", substitute with --A & B--.

Signed and Sealed this

Fourth Day of October, 1994

Attest:

BRUCE LEHMAN

*Attesting Officer*    *Commissioner of Patents and Trademarks*